United States Patent Office 3,126,363
Patented Mar. 24, 1964

3,126,363
NEW COMPOUNDS, POLYMERS AND
COPOLYMERS
Norman Blumenkopf, North Merrick, N.Y., and Otto F. Hecht, Easton, Pa., assignors to General Aniline & Film Corporation, New York, N.Y., a corporation of Delaware
No Drawing. Filed Dec. 28, 1959, Ser. No. 862,055
9 Claims. (Cl. 260—85.5)

This invention relates to new and useful compounds and to polymers and copolymers derived therefrom. In particular, this invention relates to N-vinyl morpholine and derivatives thereof, and to the homopolymers and copolymers with other ethylenically unsaturated compounds.

While enumerable vinylated compounds are known, and among this tremendous group some vinylated amines containing the vinyl group directly attached to the nitrogen atom of the amine, N-vinyl compounds of amines in general are extremely difficult to come by. It has been well recognized in this art that the vinylation of primary and secondary amines does not result in any useable or readily obtainable vinylated product. In such reactions the result is usually a tarry mixture. Success has been achieved where the vinylation has been attempted on low basicity secondary amines, the outstanding example being N-vinyl carbazole. It has generally been accepted that the direct vinylation with acetylene of basic amines is not a feasible method for the preparation of such compounds, and that only those amines which exhibit acidic properties could be employed in such a reaction. Contrary to all expectations, however, it has been found that morpholine, a highly basic compound, and numerous derivatives of morpholine, can be vinylated directly with acetylene to give the N-vinyl compounds. This process is described and claimed in copending application Serial No. 844,870, filed October 7, 1959, of which this application is a continuation-in-part.

The present invention is directed to the monomers of N-vinyl morpholine and of N-vinyl substituted-morpholines and to the homopolymers and copolymers thereof with other ethylenically unsaturated compounds. Other methods than that described in the aforementioned copending application may be employed to prepare the monomers of this invention and these are described in detail below.

It is therefore an object of this invention to provide new and useful compounds, and in particular N-vinyl morpholine.

It is another object of this invention to provide new and useful compounds, and particularly N-vinyl substituted morpholines.

It is still another object of this invention to provide new and useful homopolymers of the N-vinyl morpholines.

It is still a further object of this invention to provide new and useful copolymers, interpolymers, terpolymers and graft polymers of N-vinyl morpholine and N-vinyl substituted-morpholines.

Other objects will appear hereinafter as the description proceeds.

The compounds of this invention are the N-vinyl derivatives of morpholine and of the substituted-morpholines, e.g., alkyl-, alkoxy-, aryl-, and the like, morpholines.

In addition to morpholine itself, the following derivatives thereof within the scope of the above described class of derivatives may be employed.

2-methyl morpholine
2-ethyl morpholine
3-ethyl morpholine
2-ethoxy morpholine
3-ethoxy morpholine
2-phenyl morpholine
2(3,4-dioxy phenyl)morpholine
2,6-dimethyl morpholine
2,3-dimethyl morpholine
2,6-diphenyl morpholine
2,5-dimethyl morpholine
3,5-dimethyl morpholine
2,6-diethyl morpholine
2-ethyl-5-methyl morpholine
2-methyl-5-ethyl morpholine
2,6-ditertiary butyl morpholine
3-methyl-2-phenyl morpholine,
and the like.

Among the various substituents above enumerated in the morpholine nucleus, it is preferred that the alkyl and alkoxy substituents be of the lower alkyl or lower alkoxy type of from 1 to 6 carbon atoms, and encompassing thusly methyl, ethyl, n-propyl, isopropyl, n-butyl, isobutyl, tertiary butyl, amyl, and hexyl. Of the aryl substituents it is preferred to employ the monocyclic, carbocyclic types such as phenyl and derivatives of phenyl such as tolyl, xylyl, halophenyl, hydroxy phenyl, alkoxy phenyl and the like.

The preferred method for the preparation of the compounds of this invention involves the interaction of the selected morpholine or derivatives thereof with acetylene, as fully described in the aforementioned copending application. The reaction is usually conducted in a stirred autoclave at a temperature of from about 50° C. to 180° C. Elevated pressures may be employed derived from the use of superatmospheric pressures of acetylene and mixtures of acetylene with inert gases such as nitrogen and the like. In the preferred process, elevated pressures are not necessary due to the unexpected and extreme ease of reaction of acetylene with morpholine and the morpholino derivatives described above. The preferred temperature of operation is from about 80° C. to 120° C. and within this range a temperature of 100° C. has been found to give the best results. The selected morpholine may be vinylated without dilution although it is preferred to employ an inert solvent such as benzene, toluene, xylene, cyclohexane and other hydroaromatic solvents. From about 1 to 50% morpholine by weight based on weight of solution may advantageously be used. A 10% to 50% solution is preferred.

To effect the reaction it is necessary that a catalyst be employed. The preferred catalyst is an organo cadmium salt such as anhydrous cadmium acetate, cadmium stearate or cadmium naphthenate. Zinc salts are also suitable. The amount of catalyst employed is not critical and may vary from about 0.1% to about 10% by weight calculated as metal based on the weight of the morpholine compound. Due to the extreme reactivity of the N-vinyl morpholine monomers, it has been found desirable, in order to obtain maximum monomer yields, to employ during the vinylation reaction, an inhibitor. Phenyl-2-naphthylamine and substituted aminoanthraquinone have been found outstanding for this purpose. Among the aminoanthraquinones which are suitable are the following:

1,4-bis(methylamino) anthraquinone
1,4-bis(acetylamino) anthraquinone
1,4-bis(propionylamino) anthraquinone
1,4-bis(methylamino)-5,8-dihydroxy anthraquinone
1,4-bis(ethylamino)-5,8-dihydroxy anthraquinone
1-butylamino-4-methylamino anthraquinone The amount of the above described compounds which may be employed as inhibitors in the practice of this invention will vary considerably and is in no way critical. It has, however, been found that amounts from about 0.001% up to about 2% thereof based on the weight of the monomer provide adequate protection to the monomer whereby polymerization is inhibited under the conditions hereinafter to be described. From 0.01 to 1% is preferred.

The N-vinyl morpholines are extremely active monomeric compounds and polymerize very rapidly upon exposure to air at room temperatures to yield substantially colorless to yellowish, transparent, oily to flexible polymers. In addition, the monomers of this invention may be copolymerized with numerous other ethylenically unsaturated compounds to yield copolymers and interpolymers of great variations in properties. The N-vinyl morpholine polymers and copolymers may be prepared in any one of a number of different structural forms such as sheets, films, coatings, fibers, filaments, molding powders and the like. Because of the somewhat basic nature of the polymers produced in accordance with this invention, they are admirably suited for dyeing with a great variety of different types of dyestuffs. Dyes which are normally used for the dyeing of wool and nylon give outstanding results with the polymers of this invention. Dispersed dyes of the azo and anthraquinone series also may be employed to effect dyeings of these polymers. By virtue of the outstanding affinity of the polymers of this invention for the large variety of the above enumerated dyestuffs, it is possible to modify other polymer materials to increase the dye affinity thereof for similar dyestuffs. Thus a copolymer of acrylonitrile and N-vinyl morpholine containing 10% N-vinyl morpholine is readily dyeable whereas in the absence of the N-vinyl morpholine constituent, dyeings are obtained with great difficulty. Not only may the N-vinyl morpholines be used as components of copolymers and interpolymers, but they may also be used to modify the properties of other polymers in admixture therewith. It is also possible to treat numerous polymeric materials with the monomers of this invention and polymerize said monomers in situ whereby distinct copolymers, interpolymers, graft polymers, and/or mixtures of polymers are produced. The following examples will serve to illustrate the present invention without being deemed limitative thereof.

*Example 1*

174 parts (2 moles) of freshly distilled morpholine are mixed with 174 parts of benzene, then 2 parts (1.1% of the weight of the morpholine) of phenyl-2-naphthylamine are dissolved in the mixture, and finally there are added 4 parts anhydrous cadmium acetate (corresponding to 2 parts cadmium metal or 1.1%, based on the weight of the morpholine).

This mixture is now placed in a stirred one-liter autoclave of stainless steel, which is purged three times with nitrogen for removal of oxygen prior to the reaction. Then a mixture of equal parts by volume of nitrogen and acetylene is introduced up to a total pressure of 120 p.s.i.g. The temperature of the autoclave is then raised to 100° C., where reactive absorption of the acetylene takes place. Then the total pressure is now brought up to 200 p.s.i.g. with pure acetylene. The consumed acetylene is replenished every half hour by introduction of fresh acetylene up to 200 p.s.i.g. total pressure. The absorption is rapid and the reaction is stopped when abolt 95% of the theoretical acetylene absorption (50 parts by weight [=.93 moles], corresponding to a cumulative pressure drop of about 900 p.s.i.), is reached, which requires about 15 hours.

After cooling, the clear, brownish solution is then distilled under a vacuum of 20 mm. of mercury to remove the benzene solvent. The residue is then fractionally distilled at 3 mm. to give a product which boils at this pressure at 19° C. The resulting product has a refractive index $N_d^{25}=1.4775$ and analyzes as N-vinyl morpholine. The yield of monomer based on the amount of morpholine consumed is 65%. The monomer is distilled into a receiver cooled in a mixture of Dry Ice and acetone to −80° C. A small amount of a white crystalline product separates. This product is a water soluble material having a melting point of 105° C. and a sublimation temperature of 110° C. The infra-red spectrum of this product indicates the product has the following formula:

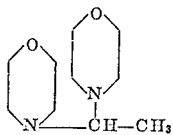

and is formed by reaction of 1 mole morpholine with 1 mole N-vinyl morpholine. After separation of this solid crystalline precipitate, the remaining monomer is then permitted to warm up gently to room temperature. After 80 minutes, the monomer content has dropped from 95% to 32.6%. After 2 hours, there has been a further drop to 21%, and after 2¾ hours, the entire mass is fully polymerized to a yellowish, transparent, viscous polymer.

*Example 2*

The procedure of Example 1 is repeated emloying 1 part of anhydrous cadmium catalyst. A yield of 56% N-vinyl morpholine is obtained.

*Example 3*

The procedure of Example 1 is again repeated employing 1 part of anhydrous cadmium succinate as a catalyst. A yield of 60% vinyl morpholine is obtained.

*Example 4*

Example 1 is again repeated using 1 part of cadmium stearate (anhydrous) as the catalyst. A yield of 46% N-vinyl morpholine is obtained.

*Example 5–10*

In the following examples, Example 1 is repeated employing the recited morpholine derivatives in lieu of morpholine in Example 1:

| Example | Compound | Yield, percent |
|---|---|---|
| 5 | 2-methyl morpholine | 67 |
| 6 | 2-ethyl morpholine | 70 |
| 7 | 2-phenyl morpholine | 49 |
| 8 | 2,6-dimethyl morpholine | 55 |
| 9 | 2-ethoxy morpholine | 63 |
| 10 | 2-phenyl-3-methyl morpholine | 60 |

*Example 11*

Example 1 is again repeated employing a 50% solution of morpholine in cyclohexane and as the catalyst, zinc naphthanate in an amount sufficient to yield 2% metal based on the weight of the morpholine. The yield of monomer obtained is 45%.

*Example 12*

Example 11 is repeated employing, however, as the polymerization inhibitor, 1,4-bis(methylamino) anthraquinone. A 48% yield of monomer is obtained.

*Example 13*

Example 1 is once again repeated employing, however, a temperature of vinylation of 120° C. The yield of monomer obtained is about 25%.

The monomers of Examples 2–13 after purification as described in Example 1, yield upon polymerization in the manner therein described, viscous to flexible polymers.

Interpolymers, binary and ternary copolymers and the like may be prepared with any of the usual ethylenically unsaturated compounds. Suitable compounds include:

Styrene

Alkyl styrenes, e.g., o-methyl styrene, p-isopropyl styrene, etc.

Alkoxy styrenes, e.g., o-methoxy styrene, 2-methoxy-5-isopropyl styrene, etc.
Halo styrenes, e.g., α-chloro styrene, m-chloro styrene, 3,4-dichloro styrene, trichloro, tetrachloro and pentachloro styrenes and the bromo and fluoro compounds
Nitro styrenes
Cyano styrenes, e.g., o-cyanostyrene, m-cyanostyrene, p-cyanostyrene
Vinyl esters of acids, inorganic, aromatic and aliphatic, e.g., vinyl chloride, vinyl bromide, etc.
Vinylidene chloride
Vinyl acetate
Vinyl methoxy acetate
Vinyl propionate
Vinyl butyrate
Vinyl stearate
Vinyl benzoate
Vinyl p-chloro benzoate
Vinyl α-naphthate
Vinyl phenyl acetate
Vinyl abietate
Vinyl ethyl fumarate
Divinyl terephthalate
Vinyl derivatives of hydrocarbons, e.g.,
    4,4′-divinyl biphenyl
    p-Isopropenyl biphenyl
    2-vinyl fluorene
    1-vinyl pyrene
    9-vinyl phenanthrene
Vinyl derivatives of heterocyclics, e.g.,
    Vinyl furan
    Vinyl dibenzofuran
    Vinyl carbazole
    Vinyl pyridine
    Vinyl pyrrolidone
    Vinyl-5-methyl-2-pyrrolidone
    Vinyl-5-ethyl-2-pyrrolidone
    Vinyl-3-methyl-2-pyrrolidone
    Vinyl quinolines
Acrylic and methacrylic compounds, e.g., acrylic acid, methacrylic acid, methylacrylate, ethyl acrylate, methyl methacrylate, cyclohexyl methacrylate, benzyl methacrylate, phenyl methacrylate, methyl α-chloroacrylate, crylonitrile
Vinyl ethers, e.g., methyl vinyl ether, ethyl vinyl ether, n-butyl vinyl ether, vinyl phenyl ether, vinyl-o-cresyl ether, and the like.
Ethylene
Propylene
Isobutylene and the like To effect the polymerization of the vinyl compounds herein described, any of the vinyl polymerization catalysts may be employed. These include oxygen, hydrogen peroxide, azo-bis-isobutyronitrile, persulfates, organic peroxides, e.g., benzoyl peroxide, diacetyl peroxide, etc., and other free-radical type catalysts. Ionic catalysts such as Friedel-Crafts agents and alkali metals may alsoced employed. Examples of ionic catalysts are zinc chloride, aluminum chloride, titanium tetrachloride, boron trifluoride, and the like.

To form the aforementioned types of interpolymers and the like, any of the conventional methods of interpolymerization may be employed, such as bulk polymerization, utilizing, if desirable, a diluent or solvent, or alternatively, one may employ suspension or emulsion polymerization in an aqueous medium or in any other suitable suspension diluent. The following examples will illustrate the formation of some of the interpolymers mentioned above.

*Example 14*

A mixture of 90 g. of acrylonitrile and 10 g. of N-vinyl morpholine with 1.0 g. of diacetyl peroxide are mixed together at −10° C. and the mixture is then heated to 50° C. A copolymer results. The copolymer, when formed into fibers in the usual manner, is readily dyeable in counterdistinction to the homopolymeric acrylonitrile which is difficultly dyeable.

*Example 15*

The procedure of Example 14 is repeated employing 90 parts of vinyl acetate in lieu of the acrylonitrile. A copolymer results.

*Example 16*

Example 14 is again repeated employing the following monomers in lieu of acrylonitrile:

(a) Styrene
(b) Vinylidene chloride
(c) Vinyl stearate
(d) Vinyl pyrrolidone
(e) Methyl methacrylate
(f) Ethyl vinyl ether Other variations in and modifications of the described processes which will be obvious to those skilled in the art can be made in this invention without departing from the scope or spirit thereof.

We claim:
1. An N-vinyl morpholine of the formula:

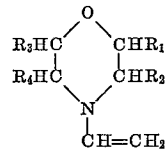

wherein $R_1$, $R_2$, $R_3$ and $R_4$ are selected from the group consisting of hydrogen, lower alkyl, lower alkoxy, phenyl, halophenyl, lower alkyl phenyl, and lower alkoxy phenyl.
2. N-vinyl morpholine.
3. N-vinyl 2-methyl morpholine.
4. N-vinyl 2-ethyl morpholine.
5. N-vinyl 2-phenyl morpholine.
6. N-vinyl 2-ethoxy morpholine.
7. N-vinyl 2,6-dimethyl morpholine.
8. Copolymer of an N-vinyl morpholine of the formula:

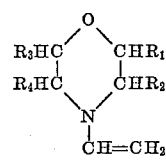

wherein $R_1$, $R_2$, $R_3$ and $R_4$ are selected from the group consisting of hydrogen, lower alkyl, lower alkoxy, phenyl, halophenyl, lower alkyl phenyl and lower alkoxy phenyl, and acrylonitrile.
9. A copolymer of N-vinyl morpholine and acrylonitrile.

References Cited in the file of this patent

UNITED STATES PATENTS

| | | |
|---|---|---|
| 2,632,757 | Reynolds et al. | Mar. 24, 1953 |
| 2,662,877 | Chaney | Dec. 15, 1953 |
| 2,891,058 | Walles et al. | June 16, 1959 |
| 2,987,509 | Burgert | June 6, 1961 |

OTHER REFERENCES

Rueggeberg et al.: J. Am. Chem. Soc., volume 69 (1947), page 1222.

UNITED STATES PATENT OFFICE
CERTIFICATE OF CORRECTION

Patent No. 3,126,363                        March 24, 1964

Norman Blumenkopf et al.

It is hereby certified that error appears in the above numbered patent requiring correction and that the said Letters Patent should read as corrected below.

Column 4, line 18, for "32.6%" read -- 42.6% --; column 5, line 44, for "crylonitrile" read -- acrylamide, acrylonitrile, methacrylamide, methacrylonitrile --.

Signed and sealed this 24th day of November 1964.

(SEAL)
Attest:

ERNEST W. SWIDER
Attesting Officer

EDWARD J. BRENNER
Commissioner of Patents